Jan. 31, 1928.

G. CHRISTIA ET AL 1,657,743

WHEEL

Filed Jan. 10, 1927

INVENTORS
George Christia
BY Peter Christia
William M. Swan
ATTORNEY

Jan. 31, 1928. 1,657,743

G. CHRISTIA ET AL

WHEEL

Filed Jan. 10, 1927 3 Sheets-Sheet 3

INVENTORS
George Christia
BY Peter Christia
William M. Ewan
ATTORNEY.

Patented Jan. 31, 1928.

1,657,743

UNITED STATES PATENT OFFICE.

GEORGE CHRISTIA AND PETER CHRISTIA, OF DETROIT, MICHIGAN.

WHEEL.

Application filed January 10, 1927. Serial No. 160,073.

This invention relates to an improved vehicle wheel, and has for its object an improved organization of parts by means of which all of the advantages as regards resiliency and ease of riding qualities can be had in a wheel equipped with a pneumatic tire without the attendant possibility of puncture due to the cutting impingement of sharp stones, nails and similar articles often occurring upon a road surface against the wall of the pneumatic tire when that forms the outer periphery of the wheel. Our invention also provides for securing the continued alignment of the wheel against vertical wobbling and other relative movement of the parts in the event of the rather rare occurrence of the pneumatic tire that is used bursting, and consequently ceasing to afford the relative support to the parts employed.

Figure 1:
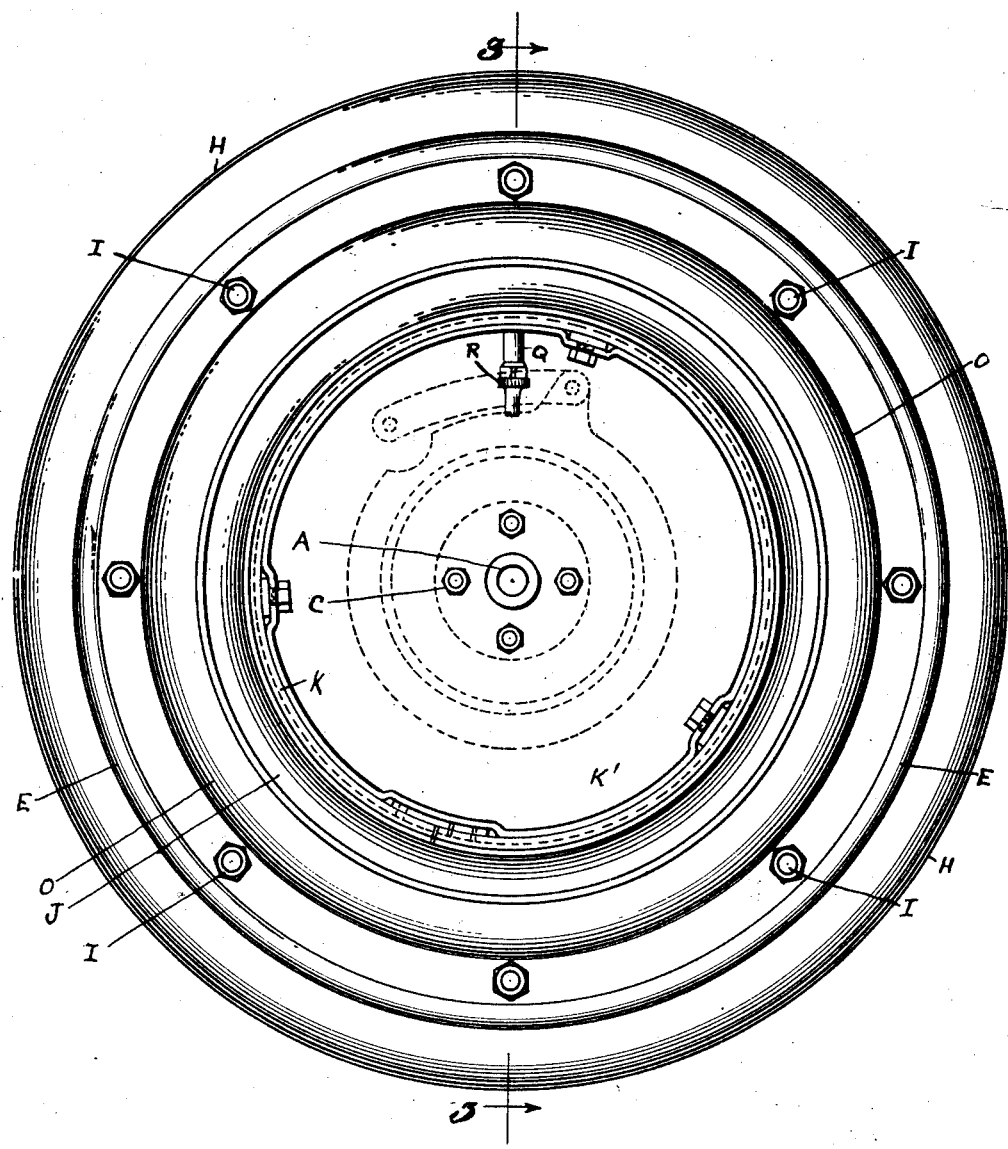
Figure 1 is a side elevational view of one face of the wheel.
Figure 2:
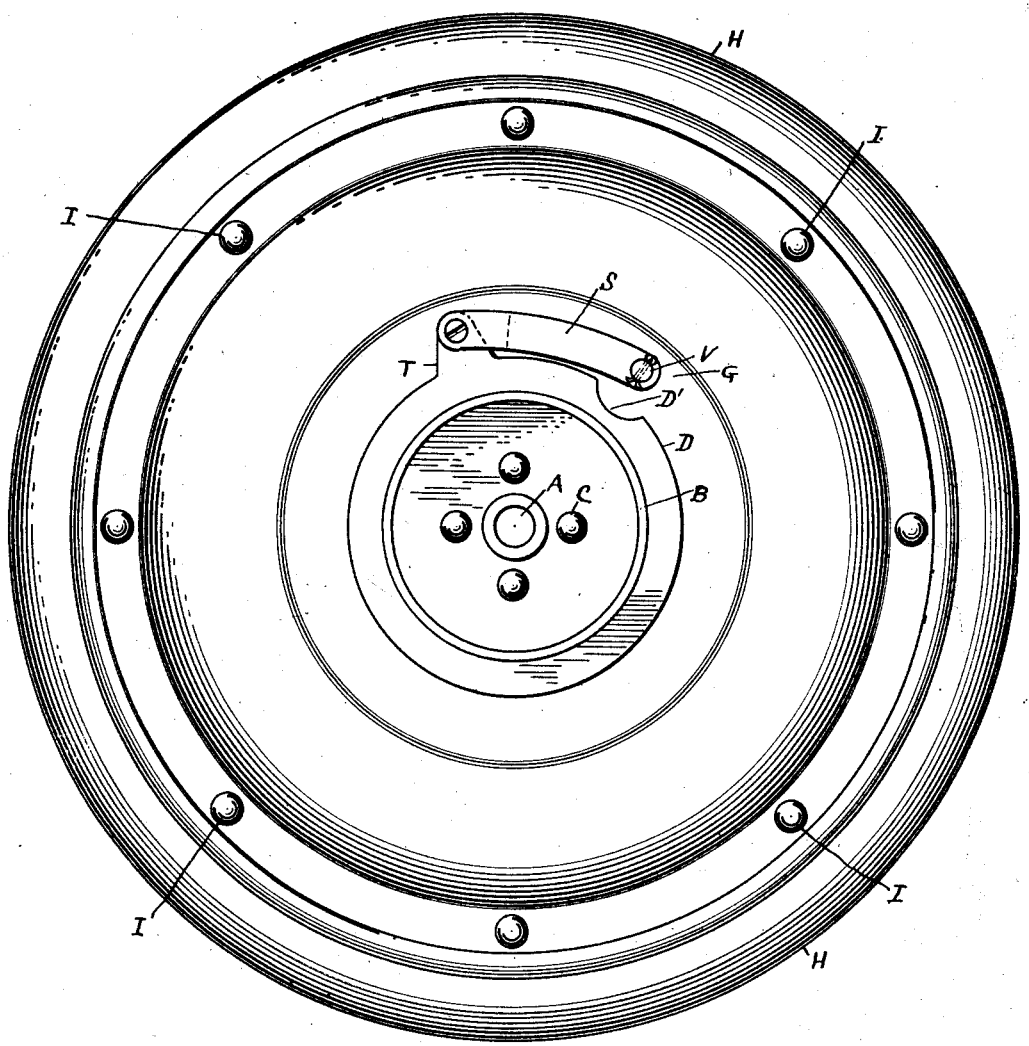
Figure 2 is a similar elevational view of the opposite face of the wheel as assembled.
Figure 3:
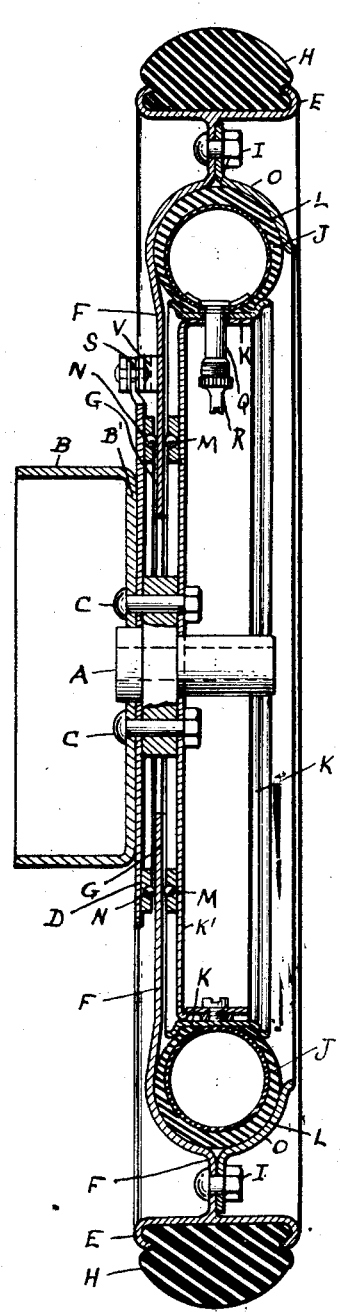
Figure 3 is a sectional elevational view of the wheel taken along the line 3—3 of Figure 1, and looking in the direction of the arrows there shown.
Figure 4:
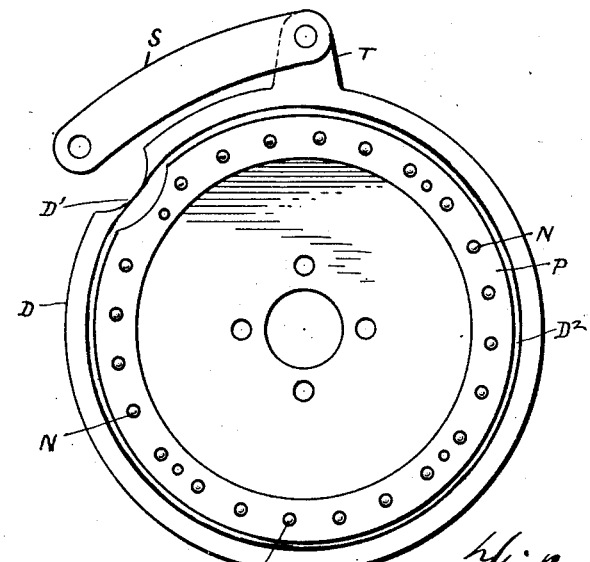
Figure 4 is a detailed elevational view of one of the central plates employed, this being shown in edge sectional elevation on the left hand side of Figure 3.
Figure 5:
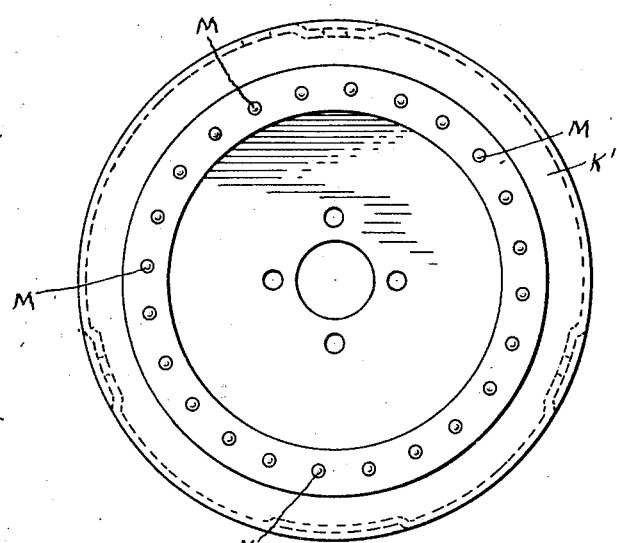
Figure 5 is a similar view of the opposite plate which is arranged in spacedly parallel relation to the plate shown in Figure 4, and with it forming the central web of the wheel.

In the preferred embodiment of our invention herein illustrated the vehicle wheel hub is indicated at A. Fixed to it by means of bolts C is the brake band B. These bolts as well pass through a plate D, thus structurally uniting it with the brake band, in contact and parallel relation with the web B' of the latter. That face of the plate D which is not thus positioned against the brake band web B' is provided near its periphery with a circle of bearing balls, as N, held in place in any desired manner, as for example by the ring P, or by providing ball-holding apertures in the plate D and tooling the metal surrounding each aperture after its ball is in place to a degree of deformation sufficient to hold each ball against falling out, though free to move rotatively therewithin. If desired, a felt washer, as $D^2$, may be placed outside the line of bearing balls, to exclude dirt and dampness.

The ball race thus constituted engages against the adjacent face G of the main wheel web F, which may, if desired, be stamped to form from sheet metal, and which is either integral with, or attached to, by bolts or otherwise, the peripheral clincher rim E, between whose inturned edges is held the tread or tire member H. This is preferably made of rubber or similar resilient material, but being solid rather than pneumatic, cuts and similar lacerating impact of sharp stones, nails or similar articles can have only a gradually wearing effect upon its life.

The web F, it will be noted, is bent slightly to one side of the central plane of the wheel as a whole, terminating in the inner edge portion G against which the bearing balls N engage on one side. Against the corresponding opposite face of this web part engage a similar ring of bearing balls M which are similarly carried near the peripheral edge of one face of the web K' of the inner rim piece K. As long as the plates or webs carrying these two series of bearing balls are held with adequate firmness against either face of the inner web portion G, their overlapping thereof makes a structurally continuous web structure, though formed of a plurality of pieces, between the hub A and the peripheral tread member H. This positioning is effected by securing to that face of the web F just inside its rim portion, of a tire seat web O, secured thereto by bolts I, which, bending in the other direction from the inclination of the web F already described, cooperates with it in forming an enclosing tread seat L for the pneumatic tube J, which is mounted upon the inner rim piece K, with its filling tube Q passing through an aperture therein and closed by the cap R, as in an ordinary pneumatic tire. When the tube J is suitably inflated, it fills the space between the seat L and the inner rim K sufficiently to not only hold the parts in desired assembled relation but as well to form a wheel structure which functions to absorb, between its periphery and its supporting hub, a large proportion of the road jolts due to the outer tire member striking road irregularities and the like; the interior positioning of the pneumatic tube J relatively to the road-engaging periphery of the wheel adequately protects it, however, from receiving the cutting impact of nails, sharp stones and the like, as the wheel travels over a road.

To effect the structural correlation of the hub A with the web of the wheel as thus built up, so that the hub and its connected parts of the wheel will not merely creep relatively to the outer or web portion of the wheel, we provide an ear T on the plate D to which is connected one end of a link S, the other end thereof being pivotally connected with the stud V on the web extension G. This leaves the plate D and its brake band, as well as the web of the inner rim piece K, free to move away from the true center of the wheel as a whole in connection with the functioning of its supported tube J in absorbing road jolts, while at the same time mechanically connecting the various parts for effecting the rotation of the wheel as a whole. Greater oscillatory movement of the hub supported parts relatively to the web and peripheral portion of the wheel may, if desired, be secured by cutting away a portion of the plate D, as at D' so that a greater eccentric movement thereof relatively to the stud V on the web extension G may take place before these two parts positively strike one another.

It has been our experience that while it is of course desirable, for securing the maximum beneficial cushioning effect from the wheel structure as thus built up, that the pneumatic tube J be kept suitably inflated, the parts are held against wobbling, even if the tube bursts or is insufficiently inflated, by the overlapping presence of the two ball-protected plate surfaces D and K' on either side of the web extension G.

What we claim is:

1. In a wheel, the combination with a peripheral tread member and a web and rim member whereon said tread member is mounted, of a pneumatic tire member peripherally engaging a portion of said web member remote from said peripheral tread member, a rim member whereon said pneumatic tire member is mounted, said last named rim member having a central web portion extending parallel with the plane of the wheel as a whole and marginally overlapping the inner portion of said first named web and rim member, a brake band web member positioned in spaced parallel relation to the web of said pneumatic tire rim member, a hub member fixed to said last named web member in perpendicular relation to the plane thereof and of the wheel as a whole, and means operatively connecting said brake band web member with the peripheral web and rim member, whereby their limited relative movement is permitted.

2. In a wheel, in combination with a peripherally external tire member and a smaller diametered pneumatic tire member, a correlating rim and web member whereby said tire members are held in spaced relation within the plane of the wheel as a whole, a rim member for said pneumatic tire member provided with a centrally apertured web portion whose outer marginal portion overlaps the adjacent inner portion of said first named rim and web member, a brake band web member positioned in spaced parallel relation to said last named web member and similarly adapted to engage the opposite face of the inner marginal portion of said first named web and rim member, ball bearing elements adapted to diminish the degree of frictional action between said marginally overlapping parts, a wheel hub fixed to said brake band web member in perpendicular relation to the plane thereof, and a link operatively correlating said brake band web member and said first named rim and web member, whereby their limited relative movement according to encountered working conditions is permitted.

3. A wheel, having coaxially disposed tread and pneumatic tube elements, a web member peripherally of which said tread element is supported and interiorly of which said pneumatic tube element is positioned, a webbed rim member whereon said pneumatic tube element is mounted, said webbed rim member marginally overengaging the inner portion of said first named web member, a brake band plate member positioned in spaced parallel relation to the webbed portion of said rim member and similarly overengaging the inner edge of said first named web member on the opposite side thereof from that engaged by the webbed portion of said rim member, a wheel hub fixed to said brake band plate member in axially perpendicular relation to the plane thereof, and means for operatively correlating said brake band plate and said first named web member while permitting limited relative movement thereof.

4. In a wheel, in combination with a centrally apertured rim and web portion, and a tread member peripherally positioned thereupon, a pneumatic tire member peripherally engaging within the correspondingly contoured interior portion of said rim and web portion, an inner web and rim element whereon said pneumatic tire member is mounted, said inner web and rim element spacedly overlapping the interior edge portion of said first-named rim and web portion, a brake band plate coaxially positioned on said inner rim and web element, a wheel hub operatively connected with said brake band plate in perpendicular relation to the plane thereof and to the general plane of the wheel as a whole, and connecting means between said brake band plate and said first named rim and web portion whereby limited relative movement of said parts is made possible.

In testimony whereof, we sign this specification.

GEORGE CHRISTIA.
PETER CHRISTIA.